United States Patent [19]
Quinion

[11] Patent Number: 5,978,559
[45] Date of Patent: Nov. 2, 1999

[54] USER INTERFACE FOR DISTRIBUTED PRINTING SYSTEM

[75] Inventor: Susan M. Quinion, East Rochester, N.Y.

[73] Assignee: Xerox Corporation, Stamford, Conn.

[21] Appl. No.: 08/946,636

[22] Filed: Oct. 7, 1997

[51] Int. Cl.⁶ .................................................. G06F 15/00
[52] U.S. Cl. .......................................... 395/114; 395/115
[58] Field of Search ..................................... 395/114, 113, 395/112, 115, 116, 101, 117; 358/296, 437; 345/326, 335, 348, 340, 352, 353; 399/1, 8, 144

[56] References Cited

U.S. PATENT DOCUMENTS

| | | | |
|---|---|---|---|
| 5,206,735 | 4/1993 | Gauronski et al. | 358/296 |
| 5,287,194 | 2/1994 | Lobiondo | 358/296 |
| 5,450,571 | 9/1995 | Rosekrans et al. | 395/500 |
| 5,467,434 | 11/1995 | Hower, Jr. et al. | 395/114 |
| 5,574,831 | 11/1996 | Grenda | 395/104 |
| 5,596,416 | 1/1997 | Barry et al. | 358/296 |
| 5,727,135 | 3/1998 | Webb et al. | 395/114 |

*Primary Examiner*—Dov Popovici

[57] ABSTRACT

There is provided a user interface, with a screen display, for use with a network document device server having a first queue communicating with a first document processing device and a second queue communicating with a second document processing device by way of a job distribution controller. The user interface includes a first activatable image area, displayable on the screen display, for indicating the number of jobs currently residing in the first queue, and a second activatable image area, displayable on the screen display, for indicating the number of jobs currently residing in the second queue. In one example of operation, the job distribution controller, in response to manipulation of both of the first and second activatable image areas, transfers the first job set from the first queue to the second queue while the second queue is disposed in the closed state.

4 Claims, 10 Drawing Sheets

Typical ASCII Job Ticket

| | |
|---|---|
| %XRXbegin: | 1.31 |
| %XRXdisposition: | PRINT |
| %XRXsenderName: | |
| %XRXtitle: | PostScript File |
| %XRXcopyCount: | 1 |
| %XRXpaperType-size: | 216  279 |
| %XRXdocumentPaperColors: | white |
| %XRXpaperType-opacity: | opaque |
| %XRXpaperType-preFinish: | Plain 0 0 |
| %XRXrecipientName: | |
| %XRXrequirements: | simplex |
| %XRXsignature: | FALSE |
| %XRXsourceFile: | . . . |
| %XRXdeleteSource: | FALSE |
| %XRXxImageShift: | 5 |
| %XRXyImageShift: | 0 |
| %XRXend | |

FIG. 3

*(PRIOR ART)*

USER INTERFACE FOR DISTRIBUTED PRINTING SYSTEM

BACKGROUND

This invention relates generally to subsystem for a network printing system and, more particularly, to a graphic user interface in which two or more graphic elements are employed to transfer a set of print jobs from a first print queue to a second print queue.

In accordance with a standard model of network printing, a job is developed at a workstation and delivered to a printer, by way of a server, for the purpose of executing the job. An example of such standard network printing modeling is disclosed in U.S. Pat. No. 5,493,634 to Bonk et al. (Issued: Feb. 20, 1996). This printing model is appropriate for those situations in which the printer is well suited for printing the job in accordance with certain criteria required by the system user. For example, if the user expects to have a selected number of prints generated within a certain time frame at a selected location, and such criteria is met at the printer, then the user is satisfied. If this criteria cannot be met, however, a certain degree of customer dissatisfaction may be ensured.

To avoid this sort of customer dissatisfaction, a distributed printing model of the type disclosed in U.S. Pat. No. 5,287,194 to Lobiondo ("Lobiondo") (Issued: Feb. 15, 1994) has been proposed. Lobiondo discloses a printshop management scheduling routine and system which provide optimum scheduling of print jobs on a network. The scheduling routine utilizes the total complex of printers available at a local location and/or remote locations to allocate and complete print jobs based on a plurality of criteria, including requested completion time for the project. If requested completion time does not allow printing of the print job by a sole printer, the print job is allocated to a plurality of available printers, each printing a portion of the complete print job.

Examples of "job type criteria" referred to in Lobiondo may include "selection of media format, size, number of copies, completion time, etc." Various systems suggest the advantage of splitting up a job and sending the resulting portions to a plurality of printers. In the October, 1995 edition of the Hardcopy Observer (published by Lyra Research, Inc.), at p. 15, a multiple printer arrangement, known as "MicroPress" is described, in part, as follows:

> Like any spooler, PressDirector's "MicroSpool" spooler takes files in, stores them until the RIP is free and sends them on to the printer. But T/R systems has added many unique functions to MicorSpool, the primary purpose of which is to make multiple desktop color lasers act like a big laser.
>
> The key MicroSpool feature is called "electronic collation." After the software rasterizes a job, the resulting pages are stored as compressed bitmaps on the system's hard drive. Then a "parsing" process sends the pages out to the available engines in exactly the right sequence so that when the printing is done, the stacks produced by each engine can be placed on top of each other to create a complete multi-copy job with separator sheets inserted between copies. "The software looks at the job and parses it so that all four engines start and finish at the same time," says Daly. "It's very involved technically. There's a big, big algorithm."

A product similar to the above-described MicroPress is referred as follows in the December, 1995 edition of the Hardcopy Observer, at p. 69:

> The product that Entire has developed is called the Image Manager. Conceptually, the Image Manager is very similar to the T/R Systems MicroPress (*Observer* 10/95) which uses a PC-based server to drive multiple Canon desktop color laser engines as if they were a single high-speed virtual machine. The Entire technology does the same thing, except that it is designed to drive multiple HP LaserJet 5Si monochrone lasers.

In contrast to the above-discussed distributed printing models in which the job appears to be partitioned on the basis of at least one job level attribute, e.g. prints produced per unit time, a Xerox Disclosure Journal article to P. F. Morgan (vol. 16, No. 6, November/December 1991) entitled "Integration of Black Only and Color Printers" contemplates an approach in which portions of a job, developed on the basis of page level information, are delivered to a plurality of printers. In particular, in the approach disclosed by Morgan, a job with black/white and color pages is provided. The job is separated on the basis of color so that the black/white part of the job is delivered to a black/white printing system and the color part of the job is delivered to a full process color machine. Preferably, color prints, corresponding with the color part of the job, are delivered to a sheet inserter so that the color prints can be inserted into a stream of black/white prints corresponding with the black/white part of the job.

Other distributed printing models are disclosed in U.S. Pat. No. 5,574,831 to Grenda (Issued: Nov. 12, 1996) and U.S. Pat. No. 5,596,416 to Barry et al. (Issued: Jan. 21, 1997). In particular, the '831 patent discloses a print array having an electronic image control device communicating with both first and second printer engines. Image data is routed from the second printer engine to the first printer engine when a failed status signal is provided by the second printer engine to the electronic image control device.

Both the above-mentioned Lobiondo patent and the Morgan article directly or indirectly address the concept of classifying a job in accordance with one or more attributes of the job. Describing a job in terms of job level and/or page level attributes is considered, in some detail, by the disclosure of U.S. Pat. No. 5,181,162 to Smith et al. (Issued: Jan. 19, 1993). The Smith patent discloses an object oriented document management and production system in which documents are represented as collections of logical components or "objects" that may be combined and physically mapped into a page-by-page layout. Stored objects are organized, accessed and manipulated through a database management system.

The concept of managing a job on the basis of its attributes is further disclosed in U.S. Pat. No. 5,467,434 to Hower Jr. et al. (Issued: Nov. 14, 1995) and U.S. Pat. No. 5,450,571 to Rosekrans et al. (Issued: Sep. 12, 1995). Each of the Hower and Rosekrans patents illustrate systems which use servers having multiple queue capability. Moreover, U.S. Pat. No. 5,129,639 to DeHority (Issued Jun. 14, 1992) discloses a system which permits interactive communication between a client and a server when the server is unable, because of an attribute mismatch, to fulfill the requirements of the client's job.

The advantage of using one or more queues in a printing process has been demonstrated by U.S. Pat. No. 4,947,345 to Paradise et al. (Issued Aug. 7, 1990). Paradise discloses a system in which copy/print jobs are delivered to an output queue which communicates with a printer while Fax jobs are delivered to a hold queue which communicates with the output queue. In practice, after a certain number of Fax jobs have accumulated in the hold queue, they are delivered to the output queue in such a manner that the Fax jobs are printed ahead of all jobs currently residing in the output queue. Another queue arrangement for a printing system is described in U.S. Pat. No. 5,206,735 to Gauronski et al.

As illustrated by U.S. Pat. Nos. 5,450,571 and 5,467,434, multiple queues can be advantageously to distribute jobs across a network printing system. It is believed that currently available systems build on the systems of the '571 and '434 patents by partitioning the various queues into sub-queues so that RIPped jobs are stored in one sub-queue, jobs to be printed are stored in another sub-queue, and so on. Moreover, any given sub-queue can include a substantial number of print jobs. Accordingly, the queue structure associated with any given queue can be quite complex and substantial in size.

As can be appreciated by those skilled in the art of queue design, opening up a queue with subqueues and performing operations relative to the sub-queues on a graphic user interface ("GUI") is not necessarily a trivial task. Moreover, complexity is compounded when two queues with their attendant sub-queues are displayed on a single GUI screen for performing such operations as moving one or more jobs from a sub-queue of a first queue to a sub-queue of a second queue. The performance of these sorts of operations, however, is essential when the printer or printers associated with the first queue goes "offline" or the number of jobs in one or more of the sub-queues of the first or second queue become imbalanced relative to other available queues within the network printing system.

In Microsoft's Windows operating system ("Windows" is a trademark of Microsoft, Inc.) a job can be moved from a first drive to a second drive without actually opening either drive. This sort of movement system is appropriate provided a user does not care about the contents of the drive in which the moved job will be received. Where, however, movement of a source job is contingent on an understanding as to the contents of the destination location, simply typing out a move command for moving the source job to a destination drive is simply insufficient. Thus, it would be desirable to provide a graphically based system that permits one or more jobs to be moved from a source queue to a destination queue in such a manner that the user is provided with a graphic indication as to the contents of the source and/or destination queues without actually opening either queue.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), 5,181, 162, 5,220,674, 5,247,670; 4,953,080 and 4,821,107. Further by way of background, some of the following Xerox Corporation U.S. patents also include examples of networked systems with printers: 5,153,577; 5,113,517; 5,072, 412; 5,065,347; 5,008,853; 4,947,345; 4,939,507; 4,937, 036; 4,920,481; 4,914,586; 4,899,136; 4,453,128; 4,063, 220; 4,099,024; 3,958,088; 3,920,895; and 3,597,071. Also noted are IBM Corp. U.S. Pat. Nos. 4,651,278 and 4,623, 244, and Canon U.S. Pat. No. 4,760,458 and Japan. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology"" . . . Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Information System, A New Personal Computer . . . "; "Xerox System Integration Standard Printing Protocol XSIS 118404", April 1984; "Xerox Integrated Production Publishers Solutions: . . . " Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart®" systems, first announced Sep. 13, 1990, are also noted.

Current popular commercial published "systems software" including LAN workstation connections includes Novell® DOS 7.0, "Windows®" NT 3.1, and IBM OS/2 Version 2.1.

Disclosures of all of the patents cited and/or discussed above in this Background are incorporated herein by reference.

SUMMARY OF THE INVENTION

In accordance with one aspect of the present invention, there is provided a user interface, with a screen display, for use with a network document device server having a first queue communicating with a first document processing device and a second queue communicating with a second document processing device by way of a job distribution controller. The first and second queues contain first and second job sets, respectively, while each of the first queue and the second queue is disposable in one of an open state and a closed state. The user interface includes: a first activatable image area, displayable on the screen display, for indicating the number of jobs currently residing in the first queue; a second activatable image area, displayable on the screen display, for indicating the number of jobs currently residing in the second queue; and said job distribution controller, in response to manipulation to one or both of said first and second activatable image area, transferring either a portion of the first job set from the first queue to the second queue or a portion of the second job set from the second queue to the first queue, wherein said transferring is performed with at least one of the first and second queues being disposed in the closed state.

In accordance with another aspect of the present invention, there is provided a user interface, with a screen display, for use with a network document device server having a first queue communicating with a first document processing device and a second queue communicating with a second document processing device by way of a job distribution controller. The first and second queues contain first and second job sets, respectively, while each of the first queue and the second queue is disposable in one of an open state and a closed state. The user interface includes: a first activatable image area, displayable on the screen display, for indicating whether the first document processing device is disposed in an operable or inoperable state; a second activatable image area, displayable on the screen display, for indicating whether the second document processing device is in an operable or inoperable state; and said job distribution controller, in response to manipulation of said first and second activatable image areas, transferring either a portion of the first job set from the first queue to the second queue or a portion of the second job set from the second queue to the first queue, wherein said transferring is performed with at least one of the first and second queues being disposed in the closed state.

DESCRIPTION OF PREFERRED EMBODIMENT (S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
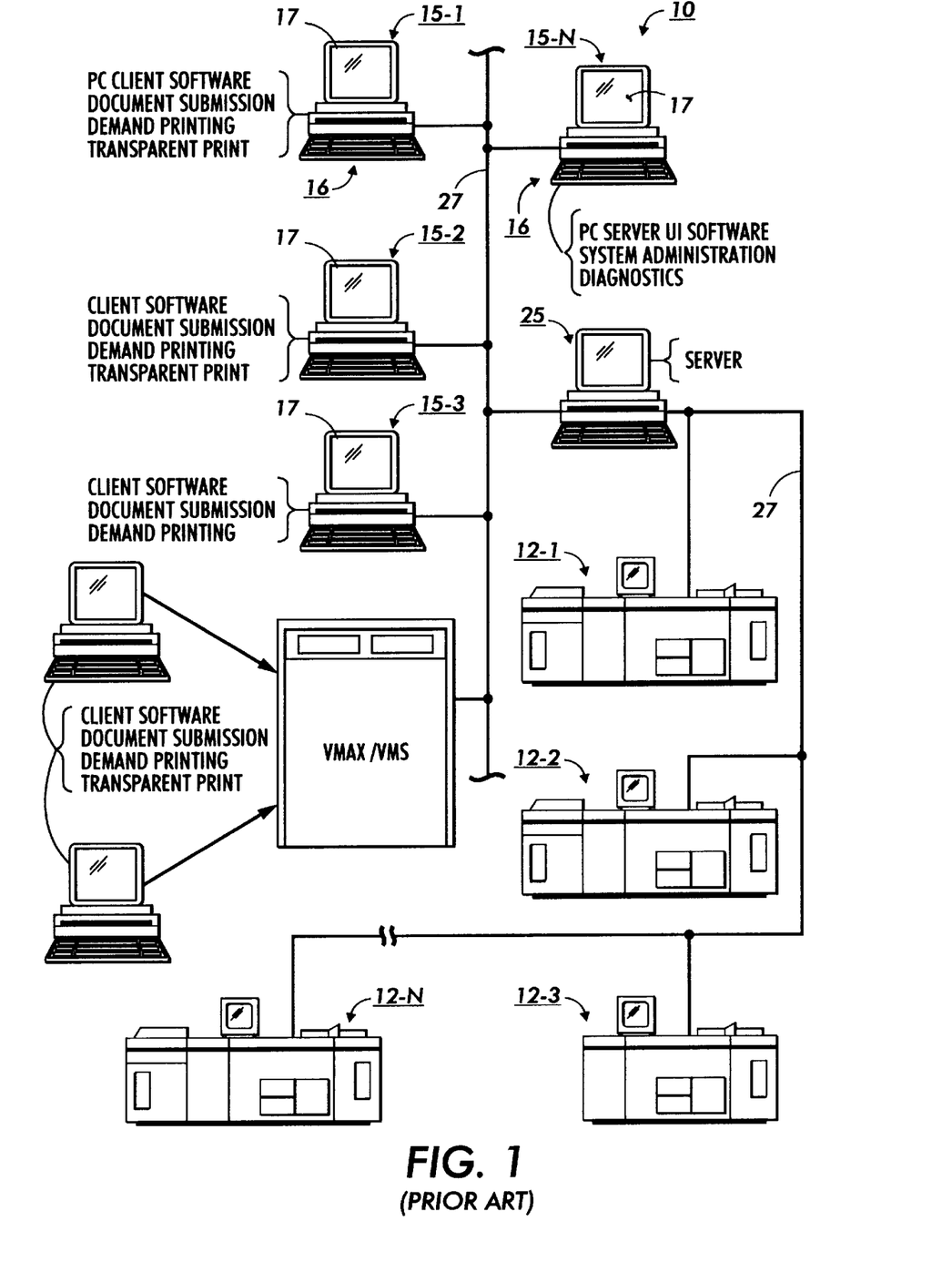
FIG. 1 is a schematic, elevational view of a network printing network printing system.

Referring to FIG. 1, there is shown a network document processing system 10 of the type adapted to incorporate the present invention. Processing system 10 comprises a plurality of printers 12-1, 12-2,12-3, . . . 12-n for processing print jobs and making prints in accordance with the job programming instructions for each job printed. Each of printers 12-1, 12-2,12-3, . . . 12-n may be any suitable printer capable of producing prints on a print media such as paper from video image signals and may, for example, comprise laser printers, ink jet printers, digital copiers, highlight or full process color printers, ionographic printers, combinations of the aforesaid devices, etc. In system 10, where multiple printers are integrated into a network processing system, individual printers typically have different document processing capabilities as will appear. As used herein, printers 12-1, 12-2, 12-3, . . . 12-n include virtual printers of the type disclosed by U.S. Pat. Nos. 5,371,837 and 5,450,571.

System 10 provides print processing for various workstations or clients 15-1,15-2, 15-3, . . . 15-n. Clients 15-1,15-2, 15-3, . . . 15-n, which may be remote and/or on site, are operatively coupled to printers 12-1, 12-2,12-3, 12-n through server 25 as will appear. As will be appreciated, while only one server and a limited number of document processing apparatuses are shown in FIG. 1, the preferred embodiment contemplates the use of as many servers and document processing units as required to meet the demands of the users of the system. Clients provide the electronic documents that are the source of the print jobs and for this purpose individual ones or all of clients 15-1,15-2, 15-3, . . . 15-n may have a document scanner, disk input, keyboard, fax, etc. for generating the electronic documents that comprise the job to be printed. Clients 15-1,15-2, 15-3, . . . 15n have a User Interface (UI) 16 with interactive screen 17 enabling programming selections for print jobs to be made, screen 17 displaying the various programming selections available in the form of a job ticket as will appear. Printers 12-1, 12-2,12-3, . . . 12-n, clients 15-1,15-2, 15-3, . . . 15-n, and server 25 are operatively interconnected by network or communication channels 27.

Figure 2:
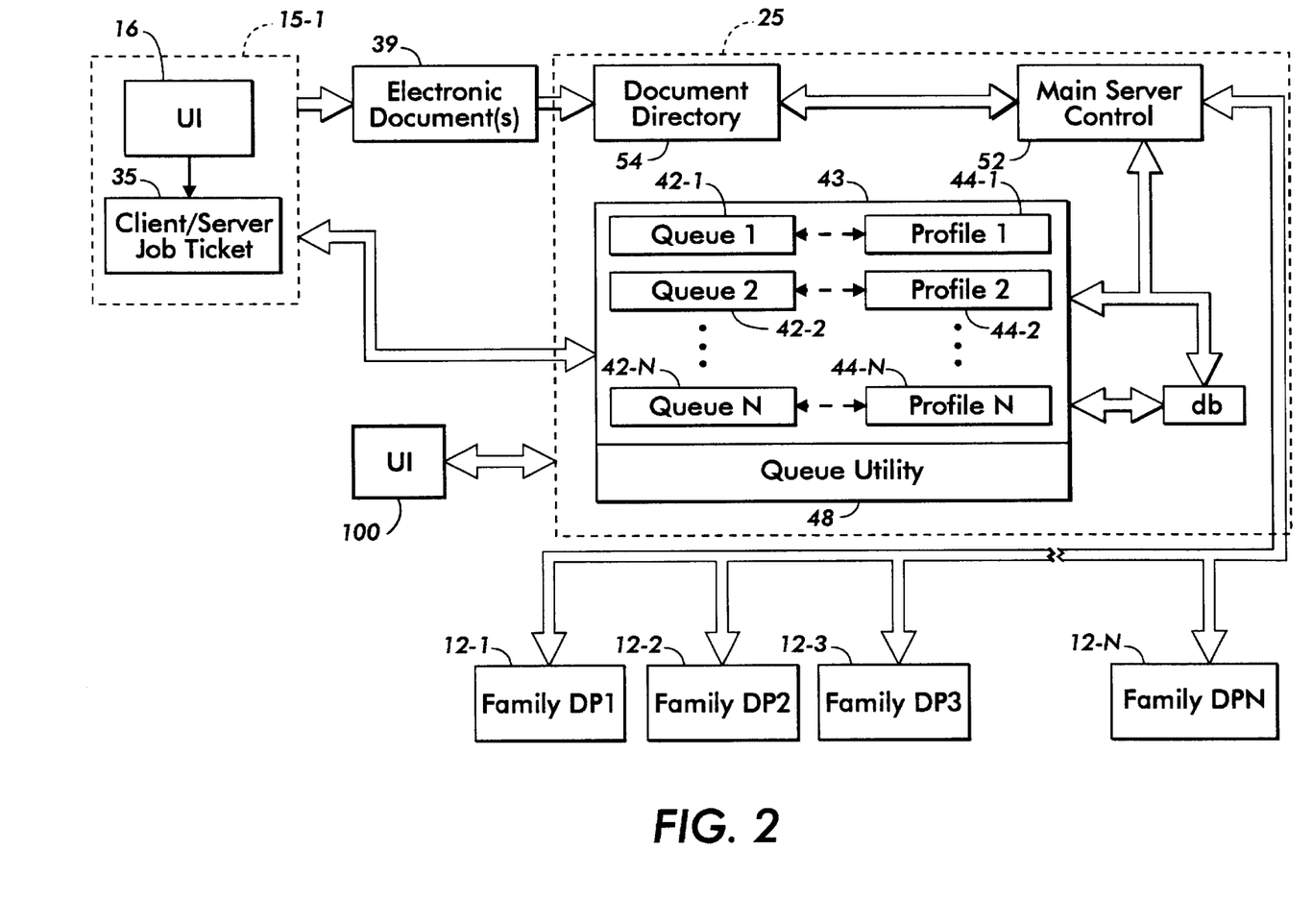
FIG. 2 is a partial, schematic, block diagram of the network printing system of FIG. 1.

Referring to FIG. 2, the relationship of a single client, such as client 15-1, to the server 25 is shown in further detail. In the illustrated embodiment of FIG. 2, the client 15-1 includes one of the UIs 16 and an electronic job ticket 35, which job ticket 35 permits the user to program a print job for transmission to the server 25. In general, the job ticket 35 includes information relating to attributes that characterize a document job. More particularly, the attributes typically include job level attributes (e.g. set quantity, copy count, finishing requirements, plex and page numbering), page level attributes (e.g. stock color separation information, image quality, reduction/enlargement and sides to be imaged), and image level attributes (e.g. size of image, color of image, location of image relative to a page). In one example, electronic document(s) 39, which includes image and attribute related information, is transmitted from the client 15-1 to the server 25.

Figure 3:
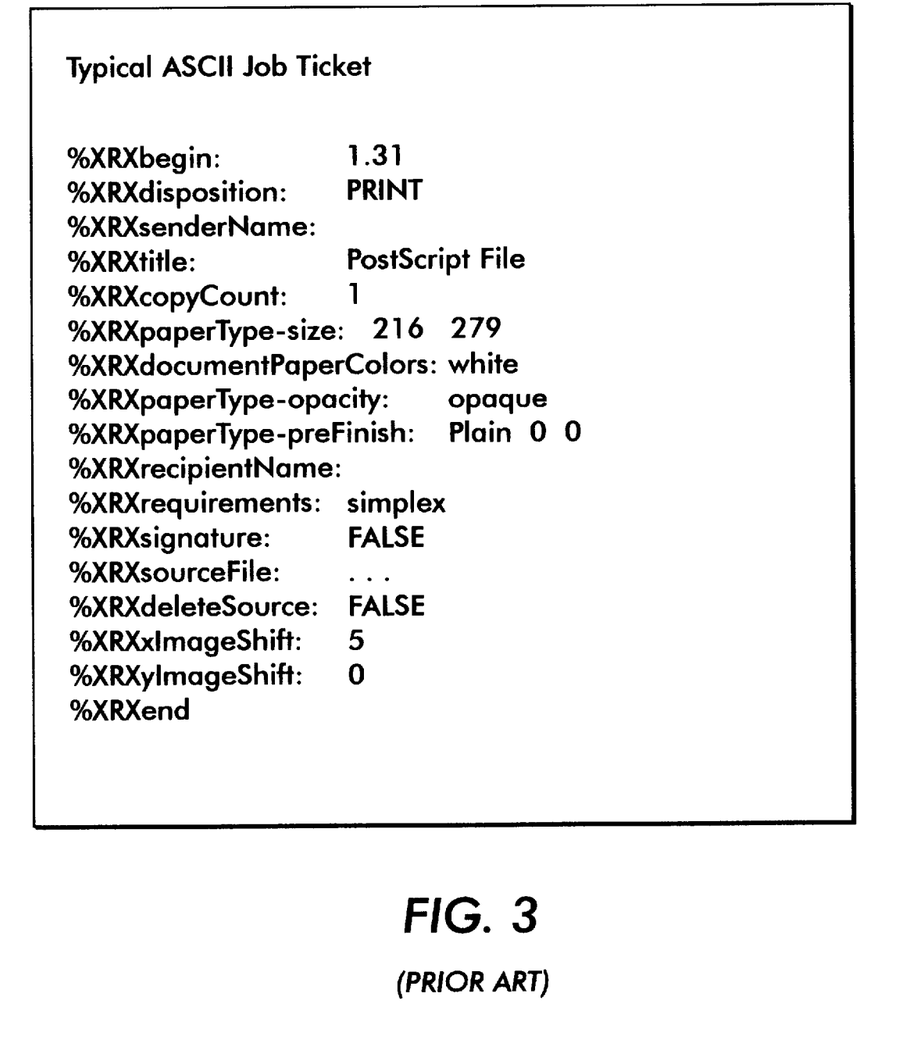
FIG. 3 is a schematic representation of a format for an electronic job ticket.

Referring to FIG. 3, the client/server job ticket 35 may assume an ASCII format. Additionally, by employment of suitable client UI interface dialog software, print job selections may be displayed on the screen 17 of the UI 16 so that the user can be apprised of which printing selections are available for programming a print job. The disclosures of U.S. Pat. Nos. 5,450,571 and 5,467,434 describe, in detail, arrangements suitable to generate job tickets for network printing systems employing multiple queues.

Figure 4:
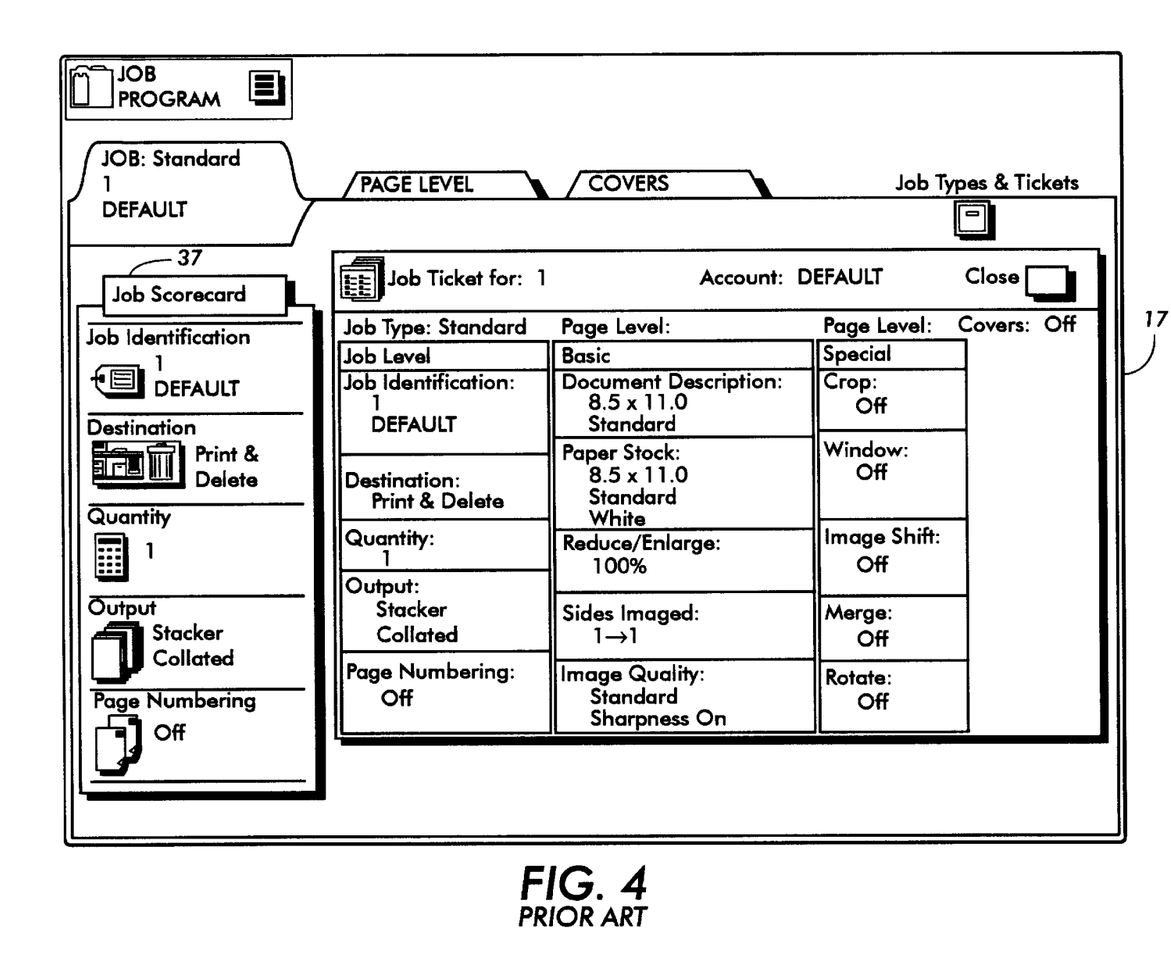
FIG. 4 is an elevational representation of a job ticket used to program portions of a print job as displayed on a client screen.
Figure 5:
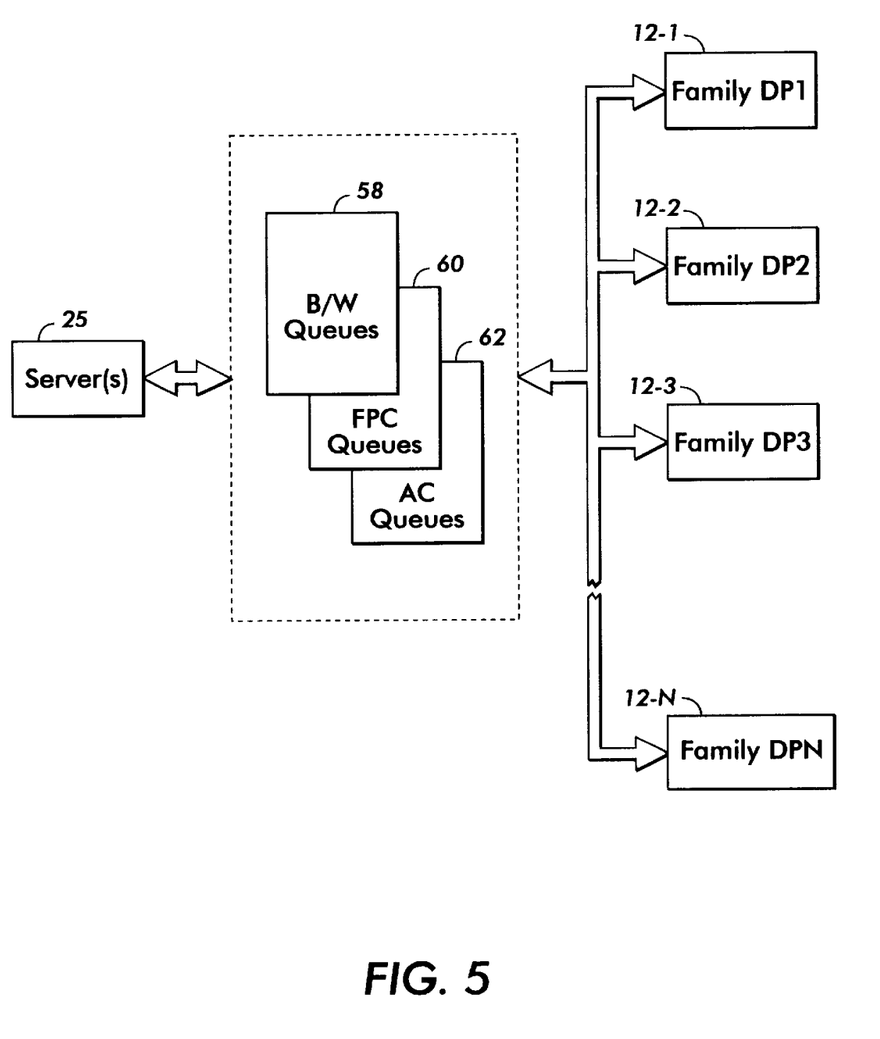
FIG. 5 is a schematic, block diagram based on the embodiment of FIG. 2 in which queues are grouped on the basis of functionality.

Examples of job ticket displays suitable for use in a network printing environment are shown in FIGS. 4 and 5 of the drawings. In particular, referring to FIG. 4, jobs are programmed in a Job Program mode in which there is displayed on the screen 17 (FIG. 1) the job ticket 35 with a job scorecard 37 for the job being programmed. Job ticket 35 displays various job selections available for programming, while job scorecard 37 displays the basic instructions to the system for printing the job. Various job ticket types are provided, with access by means of Job Types and Tickets icon 39.

Job Ticket 35 has three programming levels, referred to as "Job Level", "Basic", and "Special", each having a series of icons for accessing the various programming selections available at that level. The scorecard 37 is, in the illustrated embodiments of FIGS. 4 and 5, associated with each programming level so that on activation of a particular job/page level or of a specific icon, the appropriate scorecard 37 is displayed on screen 17. It will appreciated that certain aspects of programming, while shown as being at "Page Level" in FIG. 4, facilitate the layout of a specific image, e.g. bitmap, which image typically has its own set of specific attributes.

Referring again to FIG. 2, the server 25 includes one or more queues 42-1, 42-2, . . . 42-N, the queues (e.g. print queues) 42 being provided, for selection by the user, on a section or file 43. Each of the queues 42 is mapped to one of configuration files or profiles (e.g. print profiles) 44-1, 44-2, . . . 44-n. Each of the printer profiles includes a list of printer properties, the properties, in one example, being arranged advantageously to describe the combinations of job selections available at a selected one of the printers or family document processing units 12.

Each of the print queues 42 is associated with one or more of the document processing units or printers 12. It should be recognized that there may be plural queues for the same printer, as in the case where virtual printers are provided. Accordingly, in a second example, a printer (referred to herein as virtual printer) may be set up to provide different printer functions, with a corresponding print queue and profile provided for each different printer setup.

In the preferred embodiment the queues 42 communicate with a queue utility 48. As will appear from the description below, the queue utility is provided with the software necessary for permitting attribute information of a job to be parsed and arranged in a database 50. Corresponding image components are preferably stored in mass memory (not shown). Both of the queue utility and the database communicate with a main server control 52, the main server control being responsible for providing the queue utility with necessary processing capability facilitating the movement of data between the queue utility, database and queues. Functionality of the queue utility will be discussed in further detail below.

Referring still to FIG. 2, preferably, the electronic documents 39 are placed in a document directory 54. In one example, the server control 52 combines a set of documents 39 with a corresponding combination of print job selections to form a document job. One example of a server processor capable of combining a set of electronic documents, such as a print data (page description language) file and a corresponding combination of print job selections, such as a job ticket, into a job file for printing can be found in U.S. Pat. No. 5,226,112 to Mensing et al. (Issued: Jul. 6, 1993). Other arrangements well suited for managing jobs on a network level can be found in U.S. Pat. Nos. 5,113,494 (disclosing a server processor suitable for RIPing a document), 5,220,674 (disclosing a server with various levels control as well as database with attendant management), and 5,483,653 (disclosing a server with a parser and storage).

Figure 6:
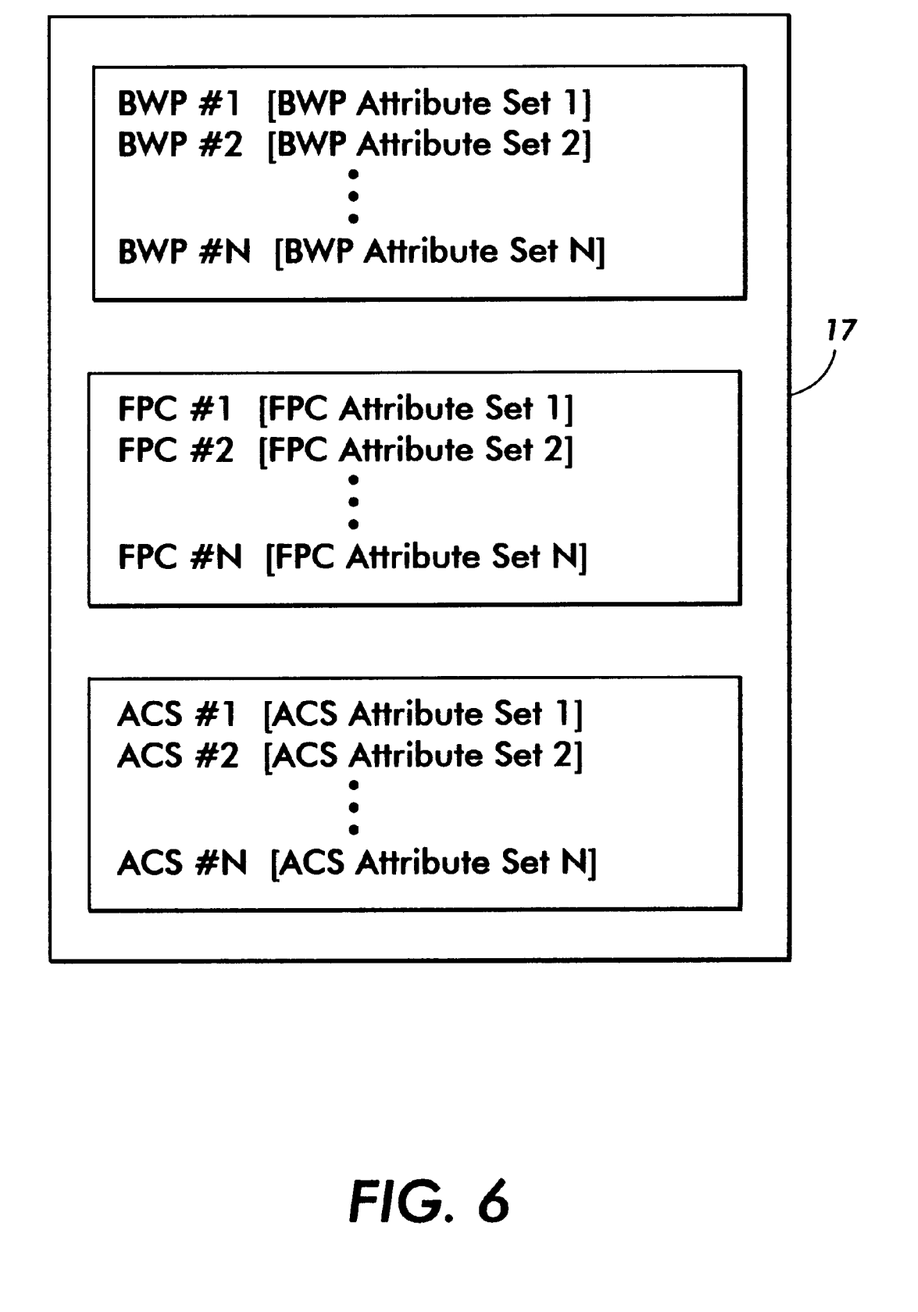
FIG. 6 is an elevational view of a screen in which available queues, grouped in terms of functionality, are displayed.

Referring to FIGS. 5 and 6, a queue arrangement suitable for use with the presently disclosed embodiment is discussed. In the illustrated embodiment of FIG. 5, the queues are organized into three groups, namely a black and white print queue group ("B/W Queues") 58, full process color print queue group ("FPC Queues") 60 and accent color print queue group ("AC Queues") 62. As will be appreciated by those skilled in the art, while three queue groups are shown in FIG. 5, the preferred embodiment contemplates the use of as many queue groups as is required to meet the demands of the system users.

Preferably the various groups are mapped to one or more servers disposed throughout the network document processing system, and referring specifically to FIG. 6, each group includes a list of queues corresponding with various network printers. As should be recognized, the printers can be grouped in terms of families, the concept of families being described further in U.S. Pat. No. 5,450,571. As should be also recognized, the families referred to in FIG. 5 need not be printers, but rather can be a host of document processing devices typically found in a distributing document processing or printing system. As follows from the discussion of queue mapping above, the various queues of the queue groups can be mapped to the document processing components or families in a manner that optimizes the individual requirements of the system users.

Figure 7:
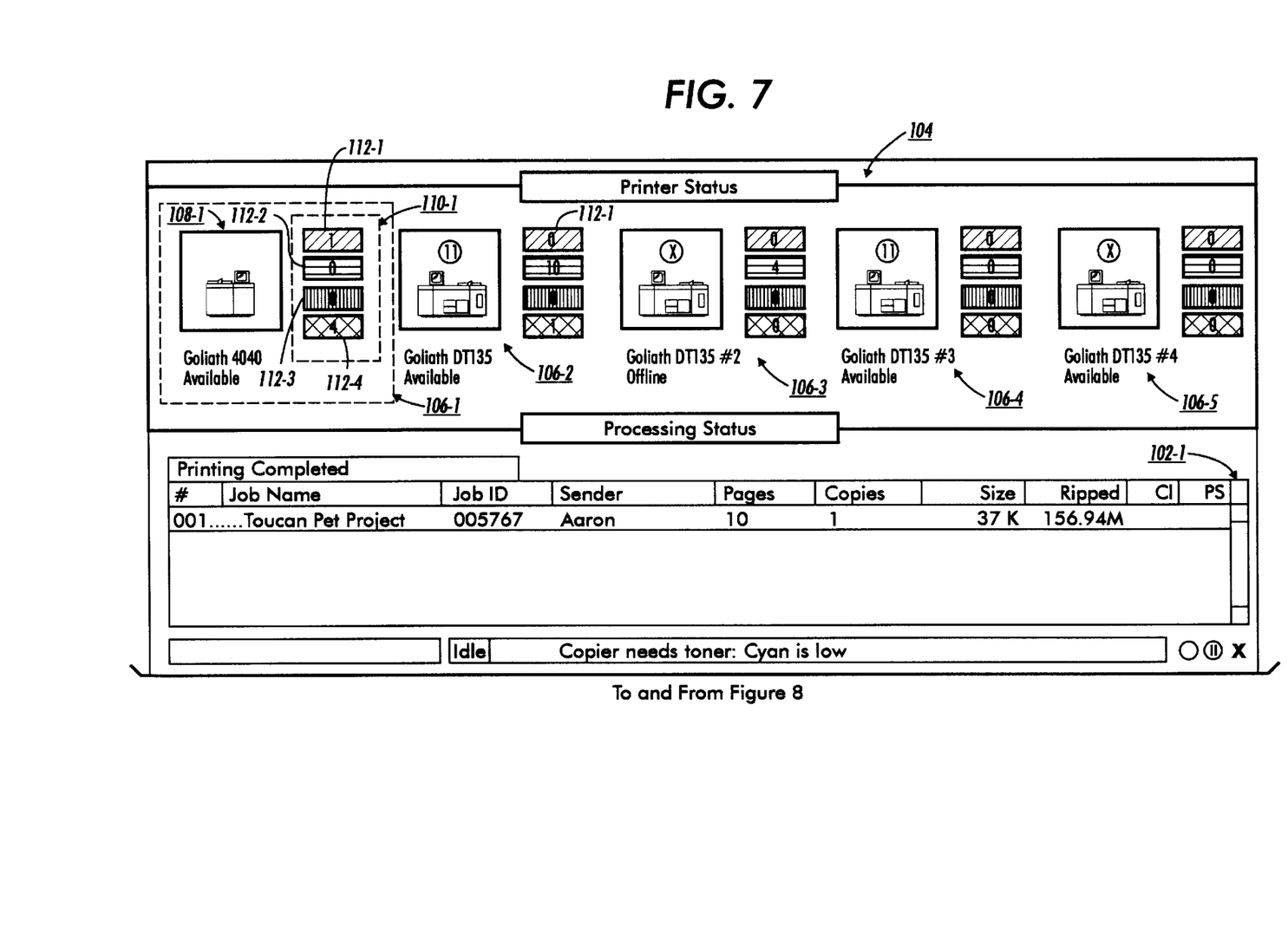
FIGS. 7 and 8 comprise an elevational representation of a dialog including device icons and a queue structure associated with one of the devices represented by one of the device icons.
Figure 8:
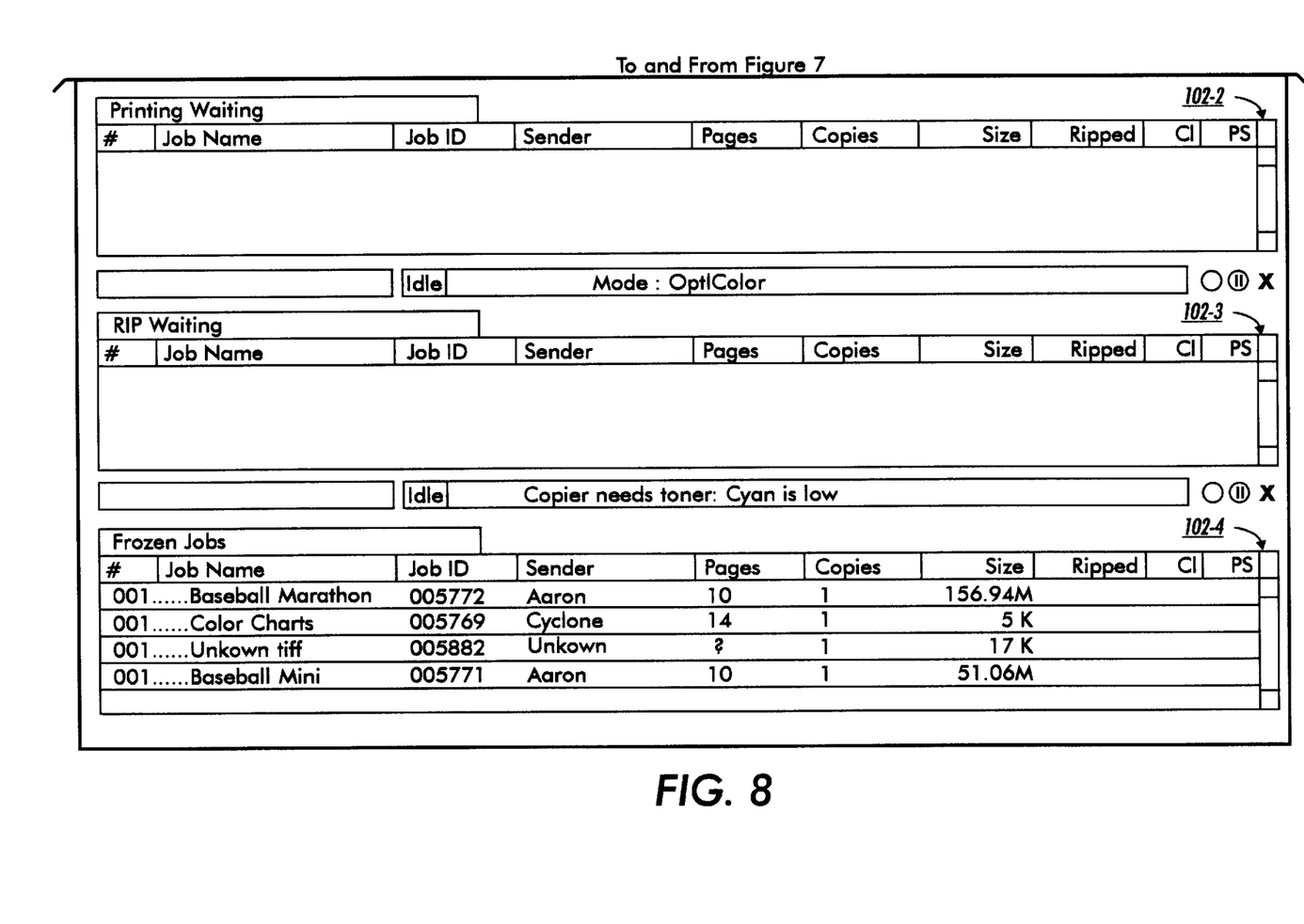

Referring now to FIG. 2 a number of queues, each corresponding with one or more document processing devices, are shown in general form. The contents of each queue can be displayed through use of a dialog 101 (FIGS. 7 and 8) for the user interface 16 or a suitable UI 100 associated with the server 25. Referring to FIGS. 2, 7 and 8 when one of the queues 42 is opened, a plurality of sub-queues 102-1, 102-2, 102-3 and 102-4 may be displayed. Use of these sub-queues is particularly advantageous in that a typical job will undergo a variety of processing states pursuant to being processed for output or printing. For example, one set of jobs may await RIPping while another set of jobs may be RIPped and simply awaiting marking. As shown in FIGS. 7 and 8 each queue may comprise up to four sub-queues and when manipulating jobs between two queues it may be necessary to open up eight sub-queues. This has been found to be unwieldy in that a great amount of information is displayed on a display screen at one time. To alleviate this situation a display panel 104, the details of which will be explained in detail below, is provided.

The panel 104 includes device icons 106-1, 106-2, 106-3, 106-4, and 106-5. While the illustrated embodiment of FIGS. 7 and 8 shows five device icons, there is actually no limit to a number of device icons that can be provided for the dialog 101. As will be recognized, however, only so many icons can be shown at one time on the panel 104, but in one example the dialog can be extended beyond the viewing range of a display screen and suitable scrolling can be employed to access each of the icons 106.

Preferably each of the device icons 106 is configured with the same structure, so a discussion of device icon 106-1 serves as a basis for understanding all of the device icons 106. In particular the device icon 106-1 includes a device configuration icon 108-1 and a processing information icon 110-1. As shown, the processing information icon 110-1 includes a set of activatable image areas 112-1, 112-2, 112-3, 112-4. Since the activatable image areas 112 correspond with the sub-queues of the queue with which the device icon corresponds, in the illustrated example of FIGS. 7 and 8, image activatible areas on 112-1, 112-2, 112-3, and 112-4 correspond respectively to sub-queues 102-1, 102-2, 102-3, and 102-4. Moreover, while the activatible image areas 112 are shown as being buttons, which are typically activated with a cursor (not shown) the activatible image areas 112 may assume various forms, such as a set of touch elements. Finally, the buttons 112 include numbers which correspond directly with the number of jobs in the sub-queues of the queue with which device icon 106-1 is associated.

Referring again to icon 108-1, information regarding the type of document processing device associated with icon 106-1 and other status information, such as the availability of a target device associated with the icon are provided. It is contemplated, that the sub-queues and other pertinent status information, such as attributes associated with the document processing device, can be obtained by simply selecting the icon 108-1. Referring now to the buttons 112, each of the buttons is color coded to correspond with comparable buttons on the panel 104. That is, but 112-1 is comparable to a button 112-1 in device icon 106-2 so that when the button 112-1 is open in device icon 106-2 a "printing completed" sub-queue for the queue associated with device icon 106-2 is open along with other corresponding sub-queues for the queue associated with device icon 106-2. It should be appreciated that the appearance of the buttons could be altered without affecting the concept underlying the preferred embodiment. In particular, each of the buttons could be reconfigured in terms of graphical appearance, shape, or texture to provide the same effect as shown in FIG. 7—the only constraint being that buttons for a given sub-queue type are preferably provided with the same appearance.

Figure 9:
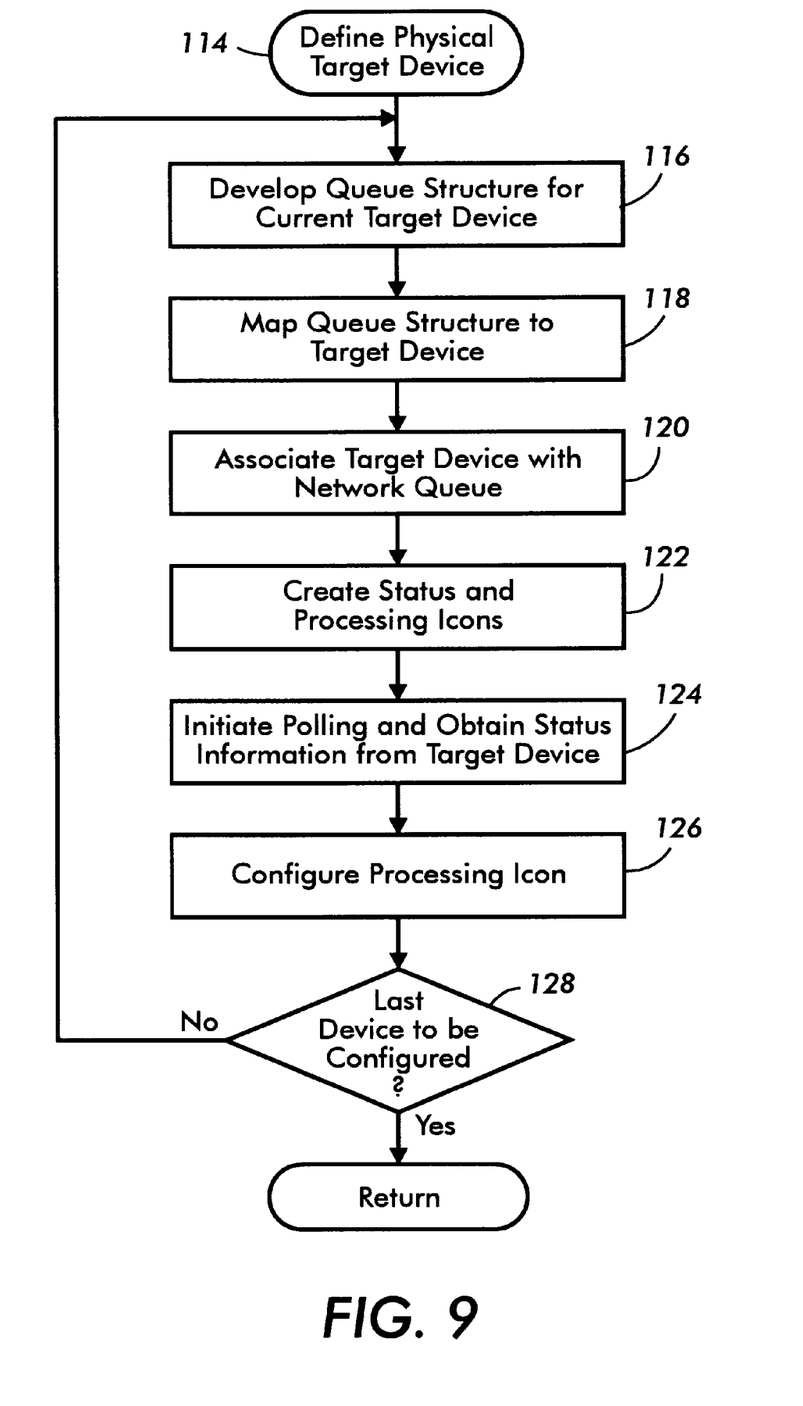
FIG. 9 is a flow diagram depicting an approach for developing the dialog of FIGS. 7 and 8.

To more fully appreciate how the device icons 106 are configured initially, reference is made to FIG. 9. Initially, in setting up a device icon (step 114) a physical target device, such as a printer 12-1 (FIG. 1) is defined. In defining a target device, set-up attributes are provided in terms of device name (e.g. "Goliath" 4040 for Goliath DT 135) IP address of the device, etc . . . Upon defining the device, a queue structure, such as that shown in FIGS. 7 and 8 is provided for the current target device at step 116. The queue structure is then mapped to the current target device (step 118), and then the target device is, via step 120, associated with a network queue, such as one of the queues 42 in FIG. 2.

Referring still to FIG. 9, with the target device associated to a network queue, the components of the device icon 106, namely device configuration icon 108 and processing information icon 110 are, via step 122 created. Polling is then, at step 124 initiated so that configuration related information from the target device is obtained. It will be appreciated that a controller such, as that included in main server control 52 (FIG. 2) is provided for configuring the icons and, more particularly, suitable software is used with the controller to provide "pictures" of the buttons 112 and correspond the buttons with respective sub-queues so that numbers representatives of the jobs of the sub-queues can be provided (see step 126). Referring to step 128, the above-described configuration approach is used to initialize each physical target device for which a queue system, including a device icon, is to be provided.

Figure 10:
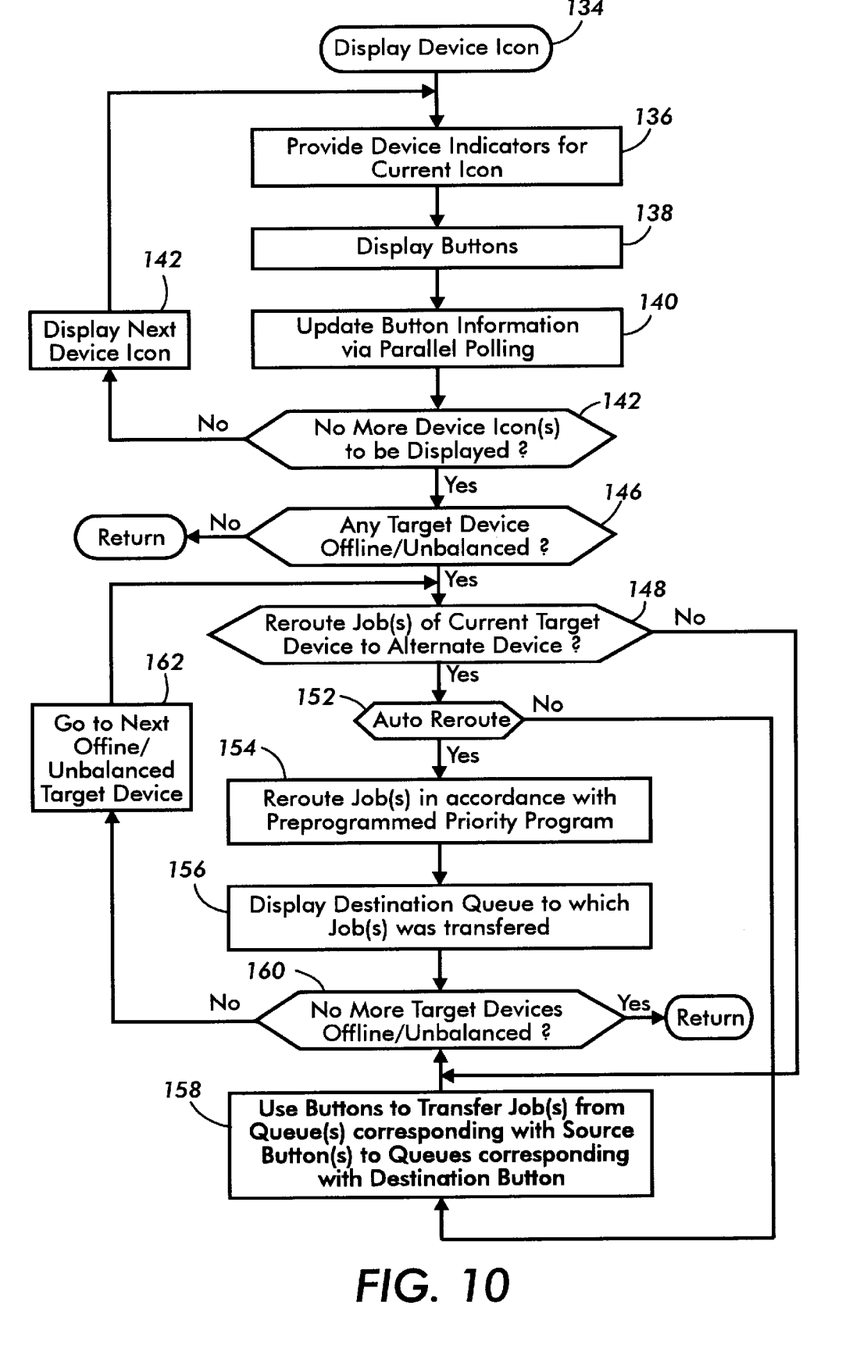
FIG. 10 is a flow diagram depicting a manner in which the dialog of FIGS. 7 and 8 is employed.

Referring now to FIG. 10 a system for using the device icons 106 is described in further detail. While the illustrated embodiment of FIG. 10, describes an approach in which the device icons are provided/displayed serially, actions with respect to the icons can, as will appear, be provided in parallel. Initially, at step 134 a device icon, such as device icon 106-1, is displayed. In turn, at steps 136 and 138, indicators for a current device, such as device configuration indicator 108-1 and buttons 112 are provided. Parallel polling is employed at step 140 to update button information so that the number of jobs in each sub-queue is provided. In the illustrated example of FIG. 10, steps 142 and 144 are used to facilitate the performance of 136, 138 and 140 for each display icon to be shown in the panel 104.

With all of the device icons displayed on the panel 104, a user can readily determine (step 146) whether any target device is available/offline and/or unbalanced. If the number of jobs in the various sub-queues are appropriately distributed, then the application of FIG. 9 exits by way of a return. If, however, some redistribution of jobs is required then the process proceeds to step 148 where an examination of offline/unbalanced sub-queues are examined.

It should be appreciated that rerouting of jobs can be achieved through either manual or auto rerouting. To determine whether auto rerouting is appropriate (step 150), the controller of main server control 52 (FIG. 2) looks to a suitable location in memory to determine if a user has provided a rerouting priority structure. This structure could employ a database of the type disclosed in U.S. Pat. No. 5,647,461 to Hayward et al. (Issued: Aug. 12, 1997) in which a job distribution profile is provided, and also employ a job transferring system of the type disclosed in now allowed U.S. patent application Ser. No. 08/563,808 to Austin et al. (filed Nov. 28, 1995)—the disclosures of the '461 patent and '808 patent application are incorporated herein by reference. If automatic rerouting is desired, then jobs are rerouted automatically from one sub-queue to another sub-queue (step 152) in accordance with a preprogrammed priority profile. In order to provide a user with information as to which queue contains the rerouted jobs, a suitable display of a destination queue at which the job was received is communicated at step 154.

In a manual approach to the preferred embodiment, the process proceeds to step 158 where a user employs the buttons 112 to move a set of jobs from a source sub-queue to a destination sub-queue. In one contemplated embodiment, a move procedure is effected by selecting one of source buttons 112 (FIG. 7) with a suitable pointing system (e.g. mouse with curser) and designating an appropriate destination sub-queue by selecting a destination button. As will be appreciated by those skilled in the art, suitable software or code for implementing the above-mentioned selecting and moving operations can be written without undue experimentation. One reference source for writing such software can be found in either publications relating to Xerox Network Systems (See e.g. Globalview Operating System referenced above in Background) or patents related to Xerox's DocuTech product (See e.g. U.S. Pat. No. 5,206,735 to Gauronski et al. where jobs are moved between queues).

Other ways of moving jobs between image activatable areas (e.g. icons or files) can be contemplated by those skilled in the art. In one example, a source button would be selected initially and one of configuration icons 108 would then be selected as a destination location for jobs associated with the source button. Under this example, software allowing the queue associated with the selected configuration icon to determine which sub-queue should function as the destination sub-queue would be provided. In another example, the buttons would be touch sensitive so that selection of source/destination sub-queues would be achieved by touching the buttons. In another example, selecting a destination location would be facilitated through use of a pop-up menu of the type taught by U.S. Pat. No. 5,630,079 to McLaughlin, the disclosure of which is incorporated herein by reference.

In yet another example, conventional GUI principles would be employed to move jobs from one image activatable area to another. More particularly, in the above-referenced XNS systems, drag-and-drop functionality is employed to move one or more jobs from an open electronic file to a printer icon. Moreover, in known IBM systems (See e.g. U.S. Pat. No. 5,608,860 to Fitzpatrick et al., the disclosure of which is incorporated herein by reference) drag-and-drop functionality is also employed to move information in the context of a printing system. It is believed that a manner of using these teachings to optimize the above-discussed move procedure would be apparent to those skilled in the art.

Referring specifically to FIGS. 7 and 8, a greater appreciation of how step 158 operates can be achieved. In a first example "Goliath DT 135 #2" is shown by its corresponding device icon 106-3 to be "Off line". At the same time, four jobs reside in the "Print Waiting" sub-queue and it would be advantageous to move those jobs to an available printing device. In the present example, the user knows that the Goliath DT 135 #4 is actually closer to his/her work location than Goliath DT 135 #3 so s/he selects button 112-2 of device icon 106-3 and designates, with the graphic selection subsystem described above, that the four jobs indicated by button 112-2 are to be moved to the sub-queue corresponding with the button 112-2 of device icon 106-5. In turn the controller of main server control 52 moves the four jobs in the Print Waiting sub-queue of Goliath DT 135 #2 over to Goliath DT 135 #4. It should be appreciated that a similar process would be employed in an automatic rerouting scheme except that the appropriate intelligence employed by the user in the moving operation would be implemented with suitable software.

It should also be appreciated, that the redistribution scheme of step 158 can be used to provide better balance to the sub-queues. In particular the Print Waiting sub-queue of Goliath DT 135 includes 10 jobs and the Goliath DT 135 #3 has no jobs in the Print Waiting queue. Accordingly, some of the jobs of Goliath DT 135 can be redistributed to the Goliath DT 135 #3 in order to gain better balance among the printing devices of the network printing systems. For example, in one conceivable embodiment, a first touch-sensitive button could be activated and then the jobs in the corresponding sub-queue could be transferred to the next button touched by the user.

Referring again to FIG. 10, it may by desirable to perform more than one redistribution operation relative to the displayed device icons. Accordingly, steps 160 and 162 permit the user to perform as many rerouting routines as may be necessary to distribute jobs across the various sub-queues indicated by the panel 104.

Numerous features of the above-described will be appreciated by those skilled in the art. First, a user can move jobs among sub-queues without the need to "cram" large amounts of information on a given screen display. That is the user need not actually display any sub-queues, according to the preferred embodiment, in order to distribute a set of jobs from one sub-queue to another sub-queue. Indeed the approach of the preferred embodiment takes much of the guess-work out of redistributing jobs among queues. For example, when a printing device is Offline and various printing devices are available, the user need not, in accordance with the preferred embodiment, open up the queues of the available printing devices in order to determine which queue would be most suitable for receiving jobs from the Offline device.

Second, the icon display panel of the preferred embodiment presents information in a highly efficient manner. In particular, a device icon is provided for each device on a network and each device icon includes both a device configuration icon and a processing information icon. The device configuration icon provides information regarding the current configuration of the device, such as device attributes, while the processing information icon provides information regarding states of jobs being processed by a corresponding device. By including both device configuration and processing information icons on the icon display panel a significant amount of information can be obtained about both the corresponding device and its related queue(s) without opening further files for display. Additionally, the buttons of the processing information icon are coded to facilitate moving of jobs from one sub-queue to another. That is, a user can, by sight, know which sub-queues are comparable to one another in terms of queue type. For example, one can see the number of jobs in the "Printing Completed" sub-queues with a minimum amount of effort.

What is claimed is:

1. In a network printing system having a first document processing device communicating with a second document processing device by way of a network connection, the first and second document processing device communicating respectively with first and second queues, the first and second queues containing first and second job sets, respectively, a user interface, having a screen display and communicating with a job distribution controller, for managing placement of one or more jobs with respect to the first and second queues, comprising:

a first activatable image area, displayable on the screen display, for indicating a first number of jobs currently residing in a portion of the first queue;

a second activatable image area, displayable on the screen display, for indicating a second number of jobs currently residing in a portion of the second queue; and said job distribution controller, in response to user manipulation with respect to said first and second activatable image areas, transferring either a portion of the first job set from the portion of the first queue to the portion of the second queue or a portion of the second job set from the portion of the second queue to the portion of the first queue, in which the first queue includes first and second sub-queues, and the second queue includes third and fourth sub-queues, further comprising:

a third activatable image area, displayable on the screen display, for indicating a third number of jobs currently residing in the second sub-queue;

a fourth activatable image area, displayable on the screen display, for indicating a fourth number of jobs currently residing in the fourth sub-queue; and wherein the first activatable image area corresponds with the first sub-queue and the second activatable image area corresponds with the third sub-queue.

2. The user interface of claim 1, in which a third job set resides in the second sub-queue, wherein the portion of the first job set is transferred from the first sub-queue to the third sub-queue without transferring the third job set from the second sub-queue to the fourth sub-queue.

3. The user interface of claim 1, wherein:

the first and third activatable image areas are configured to have a first appearance while the second and fourth activatable image areas are configured to have a second appearance; and the first appearance is distinctive relative to the second appearance.

4. The user interface of claim 3, wherein:

the first and third activatable image areas are a first color; and the second and fourth activatable image areas are a second color.

* * * * *